United States Patent [19]
Martin

[11] 4,034,792
[45] July 12, 1977

[54] PNEUMATIC TIRE

[75] Inventor: Trevor M. Martin, Sterling Heights, Mich.

[73] Assignee: Uniroyal Inc., New York, N.Y.

[21] Appl. No.: 517,357

[22] Filed: Oct. 23, 1974

[51] Int. Cl.² .................. B60C 17/00; B60C 13/00; B60C 15/00

[52] U.S. Cl. ...................... 152/379.1; 152/330 RF; 152/353 R; 152/361 R; 152/381.2

[58] Field of Search ........ 152/330 R, 330 RF, 352, 152/353, 362 R, 362 CS, 479–483, 353 R, 379 R, 381 R

[56] References Cited

U.S. PATENT DOCUMENTS

| | | | |
|---|---|---|---|
| 1,337,660 | 4/1920 | Killen | 152/353 R |
| 1,862,269 | 6/1932 | Johnson | 152/352 |
| 2,037,640 | 4/1936 | MacMillan | 152/353 R |
| 2,874,745 | 2/1959 | Wann | 152/353 R |
| 3,421,566 | 1/1969 | Sidles et al. | 152/353 C |
| 3,983,918 | 10/1976 | French | 152/353 R |
| D. 33,338 | 10/1900 | Ducasble | 152/353 X |

FOREIGN PATENT DOCUMENTS

| | | | |
|---|---|---|---|
| 2,339,516 | 2/1974 | Germany | 152/330 RF |
| 209,440 | 1/1924 | United Kingdom | 152/362 R |

Primary Examiner—Drayton E. Hoffman
Attorney, Agent, or Firm—Charles A. Blank

[57] ABSTRACT

A pneumatic tire having a rib on each sidewall adjacent to the flange of the rim on which the tire is mounted. The overlap between the rib and the corresponding flange and the width of the rib are such that the rib interlocks with the rim flange when the tire is deflated under load to allow a deflated tire to operate on the rim without becoming disengaged from the rim.

8 Claims, 7 Drawing Figures

PNEUMATIC TIRE

This invention relates to pneumatic tires and, more particularly, to pneumatic tires capable of operating on a tire rim when deflated, for example, due to puncture.

Heretofore, tires mounted on one-piece rims having wells therein have ordinarily become disengaged from the rims when deflated under load, due to for example, a puncture, causing loss of control of the vehicle. A rim modification has been proposed utilizing a support on the rim inside the tire to prevent the tire from being disengaged from the rim. Such a construction is more complex than is desirable.

It is an object of the present invention, therefore, to provide a new and improved pneumatic tire which avoids one or more of the above-mentioned limitations of such prior tires.

It is another object of the invention to provide a new and improved pneumatic tire which is capable of operating on a tire rim when the tire is deflated without becoming disengaged from the tire rim and which is of simple construction.

In accordance with the invention, a pneumatic tire adapted to be mounted on a rim having two flanges against which the beads of the tire are seated comprises beads, sidewalls and a tread, each of the sidewalls having thereon a circumferentially extending rib adapted to surround the corresponding flange and located in close proximity thereto. The overlap between each rib and the corresponding flange along a diameter of the tire when the tire is mounted on the rim and inflated is not substantially less than ten percent of the height of the corresponding flange along the diameter. The overlap and the width of each rib are such that when the tire is mounted on the rim and deflated under load each rib abuts the rim and substantially limits movement of the corresponding bead on the rim, whereby the tire is enabled to operate on the rim in a deflated condition.

Also in accordance with the invention, a pneumatic tire and rim combination comprises two rim flanges for seating the beads of the tire, two tire beads, two sidewalls and a tread. Each of the sidewalls has thereon a circumferentially extending rib surrounding the corresponding flange and located in close proximity thereto. The overlap between each rib and the corresponding flange along a diameter of the tire when the tire is mounted on the rim and inflated is not substantially less than ten percent of the height of the corresponding flange along the diameter. The overlap and the width of each rib are such that when the tire is mounted on the rim and deflated under load each rib abuts the corresponding flange of the rim and substantially limits movement of the corresponding bead on the rim, whereby the tire is enabled to operate on the rim in a deflated condition.

For a better understanding of the present invention, together with other and further objects thereof, reference is made to the following description, taken in connection with the accompanying drawings, and its scope will be pointed out in the appended claims.

Referring now to the drawings.

Figure 1:
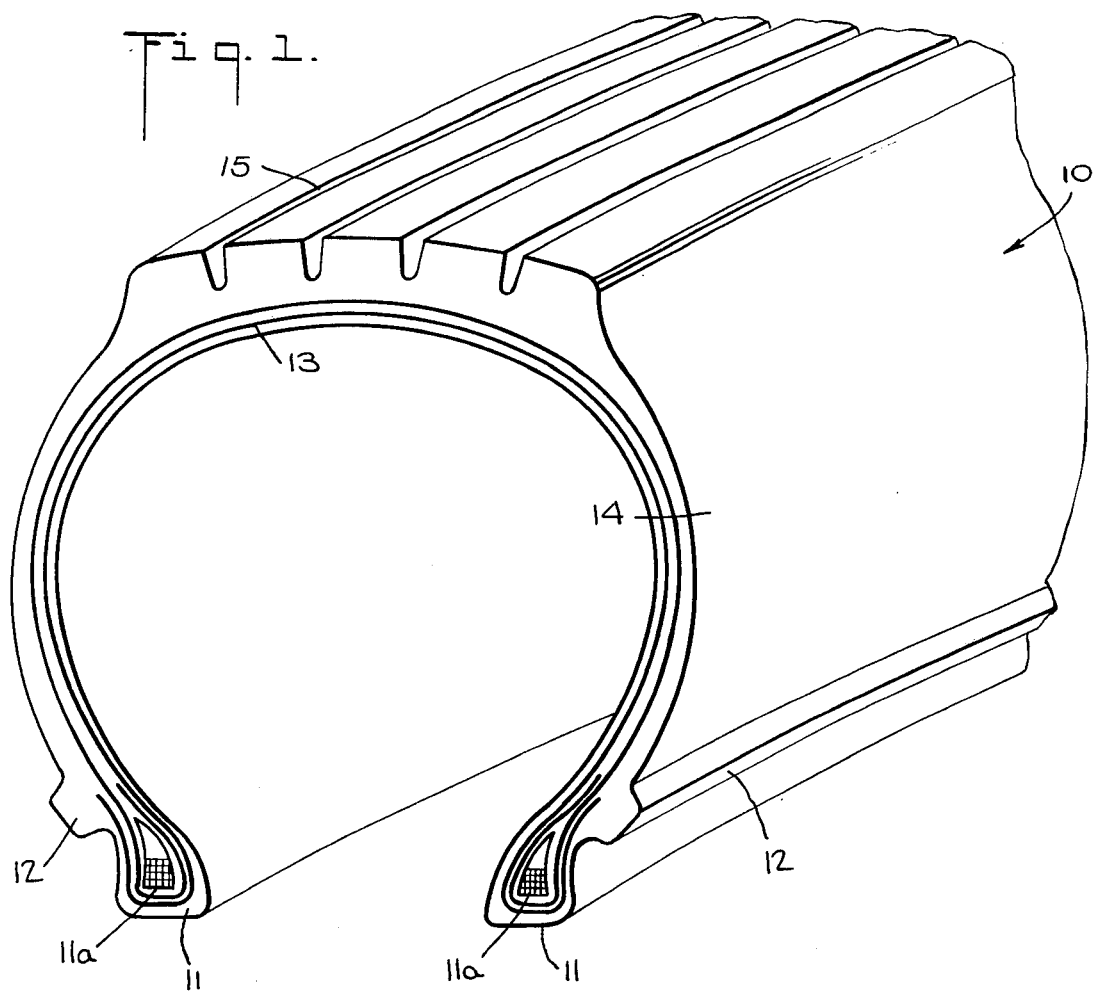
FIG. 1 is a fragmentary, perspective view of a tire cnstructed in accordance with the present invention.

Referring now more particularly to FIG. 1 of the drawings a pneumatic tire 10 in accordance with the invention adapted to be mounted on a rim having two flanges against which the beads of the tire are seated comprises beads 11 preferably having inextensible bead wire assemblies 11a incorporated in a carcass 13 of a plurality of plies of rubberized tire cord fabric having an inner air-impervious liner adherent thereto and preferably having a reinforcing belt (not shown) surrounding the carcass under the tread. The tire 10 may be a bias ply tire or a radial tire. The tire also comprises sidewalls 14 and a tread 15. Each of the sidewalls has thereon a circumferentially extending rib 12 adapted substantially to surround the corresponding flange and located in close proximity thereto.

Figure 4:
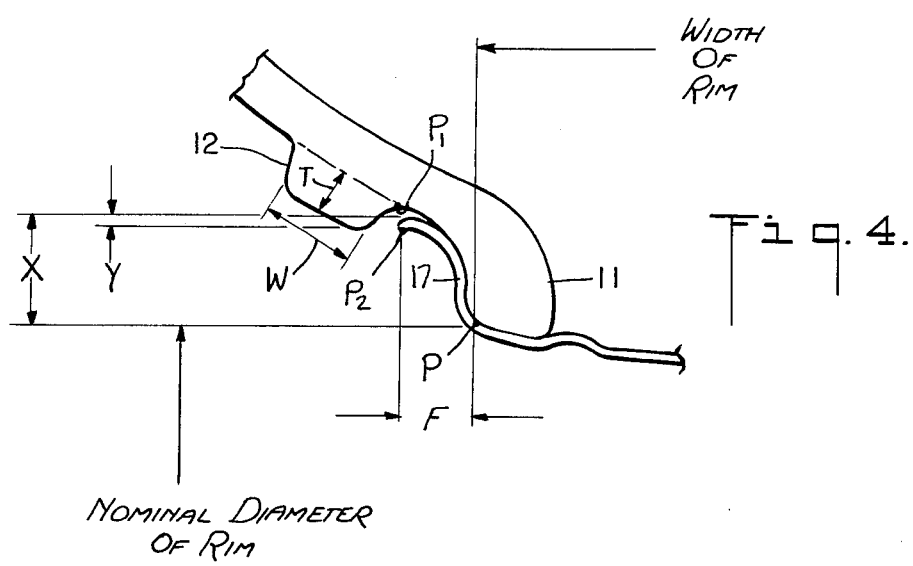
FIG. 4 is a fragmentary, sectional diagrammatic view of an inflated tire constructed in accordance with the invention and mounted on a rim.
Figure 2:
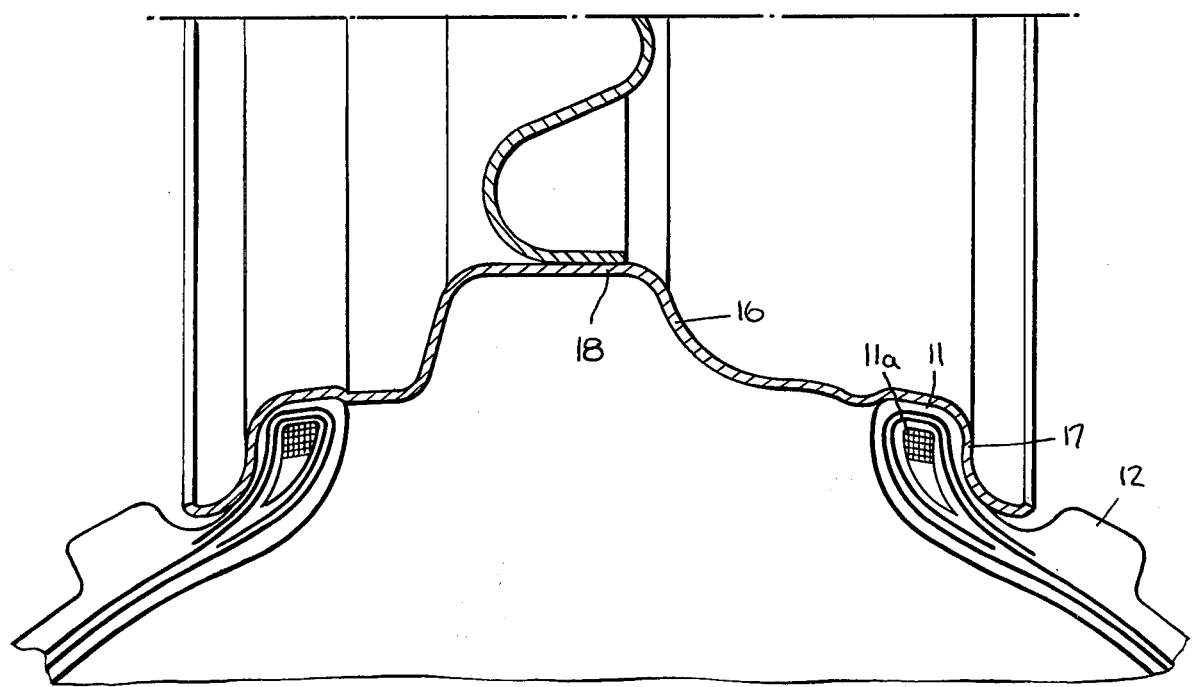
FIG. 2 is a fragmentary, sectional view of an inflated tire constructed in accordance with the invention mounted on a rim.

Referring now more particularly to FIGS. 1, 2 and 4 of the drawings, the tire 10 which may be, for exampole, of the JR-16.5 inch size, is represented as being mounted in an inflated condition on a rim 16 of conventional construction, for example, a rim of the standard JJ type described in the 1974 Year Book of the Tire and Rim Association Inc. at page 7-03. Each rib 12 is adapted substantially to surround the corresponding flange and is located in close proximity thereto. The overlap Y between each rib 12 and the corresponding flange 17 along a diameter of the tire when the tire is mounted on the rim and inflated is not substantially less than ten percent of the height X of the flange along the diameter. The overlap y and the width W of each rib are such that when the tire is mounted on the rim and deflated under load each rib abuts the corresponding flange and substantially limits movement of the corresponding bead on the rim, whereby the tire is enabled to operate on the rim in a deflated condition. The flange height X of the standard JJ rim is 0.71 inch and the overlap Y of the rib and flange is, for example, 0.070 inch. The thickness T of the rib 12 is at least substantially 0.3 inch for the passenger automobile tire size JR on the standard JJ rim. Also, for the tire size JR on the standard JJ rim, the width W of the base of the rib is preferably at least substantially ¾ inch when the rib is of unreinforced rubber stock but may be less if the rib is, for example, steel reinforced rubber stock or textile-reinforced rubber stock. For other tire sizes or rim sizes as well as tire size JR on standard JJ rim the width W of the base of the rib may be at least substantially ¼ inch when the rib is of unreinforced rubber stock but may be less if the rib is, for example, steel reinforced rubber stock or textile reinforced rubber stock. For the tire size JR on standard JJ rim, the width W of the base of the rib preferably does not exceed one inch.

As represented in FIG. 4, the overlap Y between the rib and the corresponding flange along a diameter of the tire when inflated is not substantially less than ten percent of the flange height X and preferably is not greater than fifteen percent of the flange height to allow mounting the tire at a safe pressure.

For the tire size JR on the standard JJ rim, the curve length on the tire between the point P, which is substantially at the nominal diameter of the rim at the base of each flange at the beginning of each flange, and the point $P_1$, which is at the adjacent beginning of the corresponding rib, is at least equal to, and is not substantially greater than ¼ inch longer than, the curve length on the rim between the point P substantially at the base of each flange at the beginning of each flange and the point $P_2$ at the end of each flange adjacent the corresponding rib when the tire is inflated.

Figure 3:
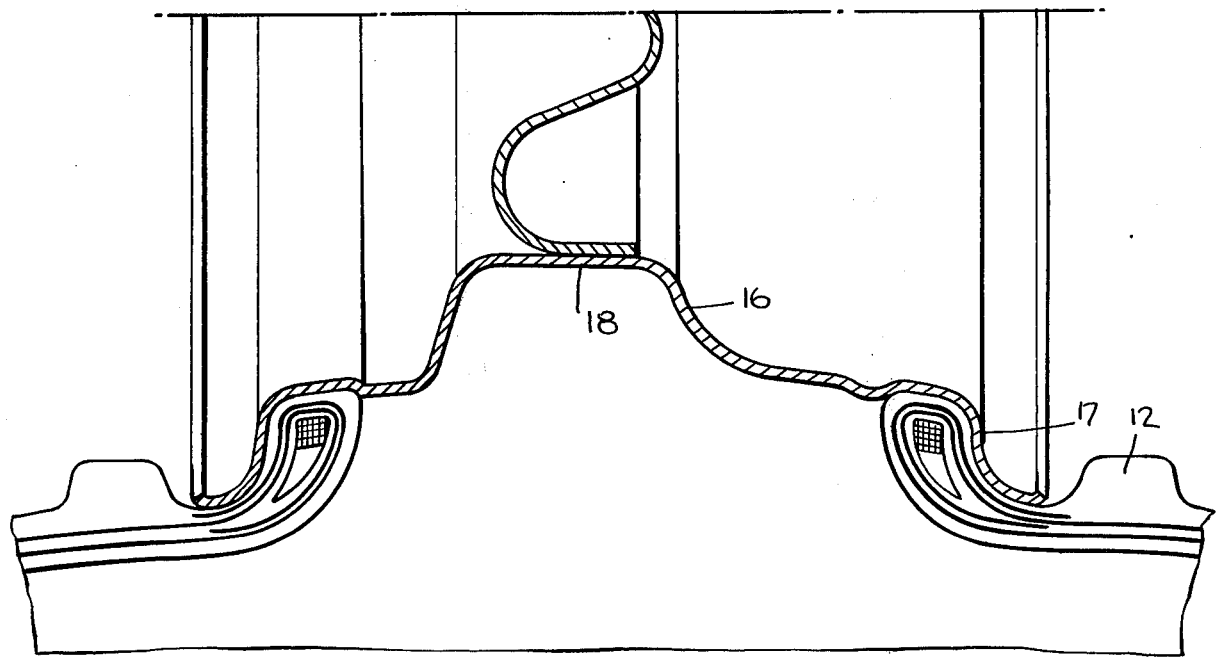
FIG. 3 is a fragmentary, sectional view of a tire constructed in accordance with the invention mounted on a rim when the tire is deflated under load.
Figures 5, 5A, 6:
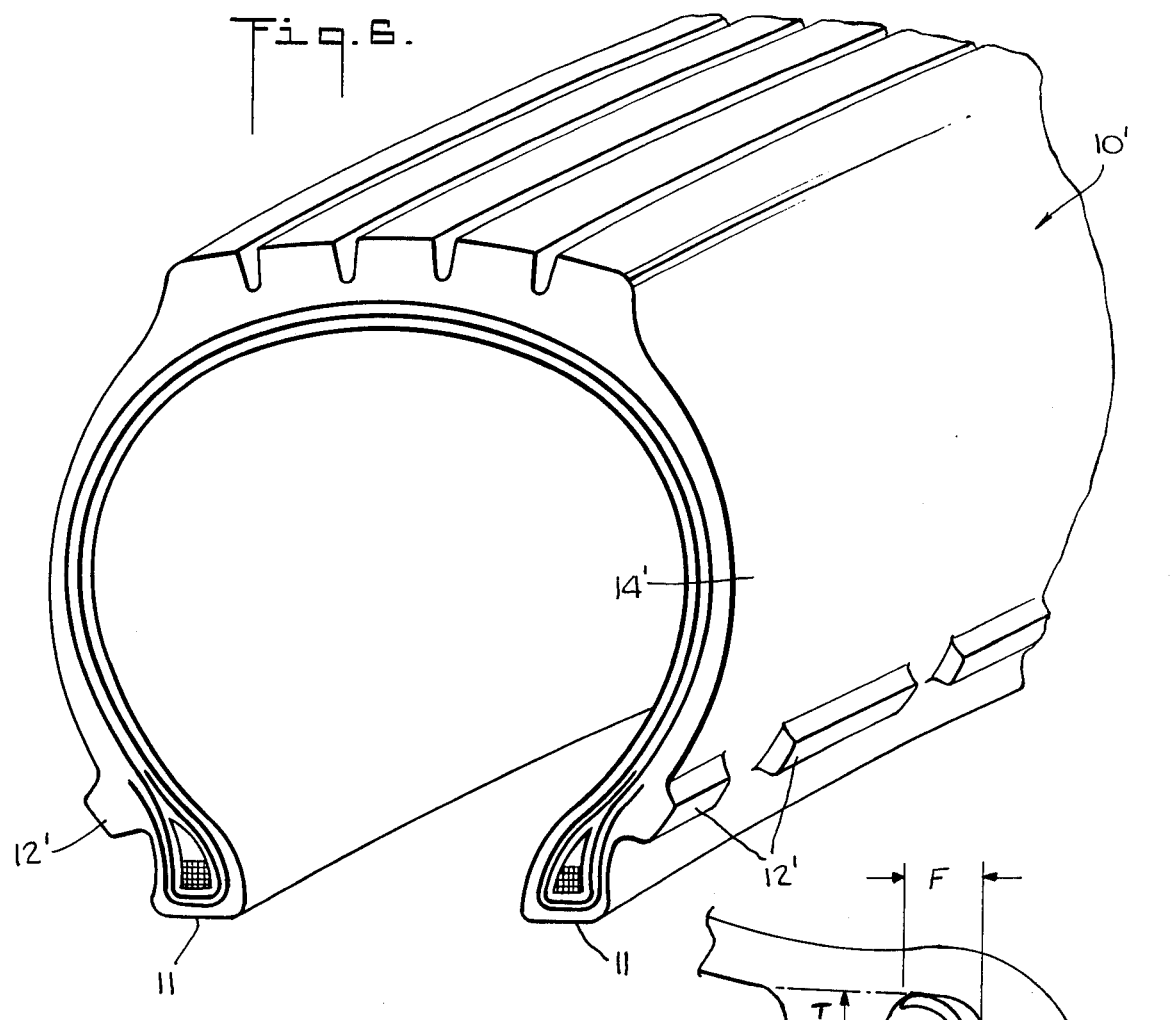
FIG. 5 is a fragmentary, sectional diagrammatic view of a tire constructed in accordance with the invention when the tire is deflated under load.
FIG. 5a is a fragmentary, sectional diagrammatic view of a tire constructed in accordance with the invention when the tire is deflated under load and with the rib abutting the rim.
FIG. 6 is a ragmentary, perspective view of another tire embodying the invention.

Referring to FIGS. 3 and 5, each flange has a predetermined width F and each corresponding rib is spaced from the corresponding flange by a distance D not more than fifty percent of the flange width when the tire is deflated under load. The distance D preferably is zero when the tire is deflated under load.

In the event that the distance D is greater than zero when the tire is deflated under load, the bead moves toward the well 18 of the rim until each rib abuts the rim, as represented in FIG. 5a, at least in the region of the tire in contact with the road and thus substantially limits movement of the corresponding bead on the rim, whereby the tire is enabled to operate on the rim in a deflated condition. It will be seen that the maximum overlap of the rim and the rib is equal to the thickness T of the rib when the tire is deflated.

In the absence of the rib, a conventional tire cannot be operated in a deflated condition because the beads move into the well between the flanges and the tire becomes disengaged from the rim. A tire in accordance with my ivention can be operated while deflated under load for a limited distance of, for example, twelve miles when the tires was removed due to destruction of the tire without the bead becoming disengaged from the rim.

Referring now to FIG. 6, the tire there represented is similar to the FIG. 1 tire with corresponding parts being identified by corresponding reference numerals primed. The rib 12' is a discontinuous rib having portions of a given circumferential length which are spaced from each other by a circumferential distance not greater than ½ the length of each rib portion so that the rib substantially surrounds the corresponding flange. Cure time can be reduced accordingly. In some embodiments, the rib portions need not be all of the same length and the spacings between rib portions may be different.

Also, in some embodiments, the circumferential ribs may have circumferential slits therein or may have spaced holes therein to improve curing and reduce weight.

The rib preferably is molded on the tire sidewall but could be bonded to the sidewall.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. The combination of a rim having two flanges against which the beads of a pneumatic tire are seated and a pneumatic tire mounted on the rim, the tire comprising: beads having inextensible bead members therein, sidewalls, and a tread, said sidewalls having their maximum spacing at a region of said sidewalls at a substantial distance from said flanges when the tire is inflated, each of said sidewalls having thereon a circumferentially extending rib adapted to surround the corresponding flange and spaced therefrom and located in close proximity thereto axially outside the outer end of said corresponding flange and extending radially inwardly of said corresponding flange when the tire is mounted on the rim and inflated, the overlap between each rib and the corresponding flange along a diameter of the tire when the tire is mounted on the rim and inflated being not substantially less than ten percent of the height of the corresponding flange along said diameter, said overlap and width of each rib being such that when the tire is mounted on the rim and deflated under load each rib abuts the corresponding flange and limits movement of the corresponding bead on the rim, whereby the tire is enabled to operate on the rim in a deflated condition.

2. The combination in accordance with claim 1 in which the thickness of each of said ribs is at least substantially 0.2 inch.

3. The combination in accordance with claim 1 in which the width of the base of each of said ribs is at least substantially ¼ inch.

4. The combination of a rim having two flanges against which the beads of a pneumatic tire are seated, each flange having a predetermined width, and a pneumatic tire mounted on the rim, the tire comprising: beads having inextensible bead members therein, sidewalls, and a tread, said sidewalls having their maximum spacing at a substantial distance from said flanges when the tire is inflated, each of said sidewalls having thereon a circumferentially extending rib adapted to surround the corresponding flange and spaced therefrom and located in close proximity thereto axially outside the outer end of said corresponding flange and extending radially inwardly of said corresponding flange when the tire is mounted on the rim and inflated, the overlap between each rib and the corresponding flange along a diameter of the tire when the tire is mounted on the rim and inflated being not substantially less than ten percent of the height of the corresponding flange along said diameter, said overlap and width of each rib being such that when the tire is mounted on the rim and deflated under load each rib is spaced from the corresponding flange by a distance not more than fifty percent of the flange width and each rib limits movement of the corresponding bead on the rim, whereby the tire is enabled to operate on the rim in a deflated condition.

5. The combination tire in accordance with claim 1 in which the curve length on the tire between that point of the bead substantially at the base of each flange at the beginning of each flange and the adjacent beginning of the corresponding rib is at least equal to, and not greater than ¼ inch longer than, the curve length on the rim between the point substantially at the base of each flange at the beginning of each flange and the point at the end of each flange adjacent said corresponding rib when the tire is inflated.

6. A pneumatic tire and rim combination comprising: two rim flanges seating the beads of the tire, a rim well between said flanges, two tire beads having inextensible bead members therein, two sidewalls, and a tread, said sidewalls having their maximum spacing at a region of said sidewalls at a substantial distance from said flanges when the tire is inflated, each of said sidewalls having thereon a circumferentially extending rib surrounding the corresponding flange and spaced therefrom and located in close proximity thereto axially outside the outer end of said corresponding flange and extending radially inwardly of said corresponding flange when the tire is mounted on the rim and inflated, the overlap between each rib and the corresponding flange along a diameter of the tire when the tire is mounted on the rim and inflated being not substantially less than ten percent of the height of the corresponding flange along the diameter, said overlap and the width of each rib being such that when the tire is mounted on the rim and deflated under load each rib abuts the corresponding bead on the rim, whereby the tire is enabled to operate on the rim in a deflated condition.

7. The combination of a rim having two flanges against which the beads of a pneumatic tire are seated and a pneumatic tire mounted on the rim, the tire comprising: beads having inextensible bead members therein, sidewalls, and a tread, said sidewalls having their maximum spacing at a region of said sidewalls at a substantial distance from said flanges when the tire is inflated, each of said sidewalls having thereon circumferentially extending rib portions which are spaced from each other by a circumferential distance and are adapted to surround the corresponding flange and are spaced therefrom and are located in close proximity thereto axially outside the outer end of said corresponding flange and extend radially inwardly of said corresponding flange when the tire is mounted on the rim and inflated, the overlap between each rib portion and the corresponding flange along a diameter of the tire when the tire is mounted on the rim and inflated being not substantially less than ten percent of the height of the corresponding flange along said diameter, said overlap and width of each rib portion being such that when the tire is mounted on the rim and deflated under load each rib portion abuts the corresponding flange and limits movement of the corresponding bead on the rim, whereby the tire is enabled to operate on the rim in a deflated condition.

8. The combination in accordance with claim 7 in which said rib portions have a given circumferential lengrh and are spaced from each other by a circumferential distance not greater than one-half the circumferential length of each rib portion.

* * * * *

UNITED STATES PATENT AND TRADEMARK OFFICE
CERTIFICATE OF CORRECTION

PATENT NO. : 4,034,792
DATED : July 12, 1977
INVENTOR(S) : Trevor M. Martin

It is certified that error appears in the above-identified patent and that said Letters Patent are hereby corrected as shown below:

Claim 6, column 5, line 19 before "bead" read -- flange and limits movement of the corresponding --

Signed and Sealed this

Fourth Day of October 1977

[SEAL]

Attest:

RUTH C. MASON
Attesting Officer

LUTRELLE F. PARKER
Acting Commissioner of Patents and Trademarks